C. H. VOSS.
LIGHTING SYSTEM FOR MOTOR VEHICLES.
APPLICATION FILED NOV. 1, 1920.

1,376,237. Patented Apr. 26, 1921.

C. H. Voss
INVENTOR
BY Victor J. Evans
ATTORNEY

WITNESS:

UNITED STATES PATENT OFFICE.

CHARLES H. VOSS, OF HYPOLUXIE, FLORIDA.

LIGHTING SYSTEM FOR MOTOR-VEHICLES.

1,376,237. Specification of Letters Patent. Patented Apr. 26, 1921.

Application filed November 1, 1920. Serial No. 421,158.

*To all whom it may concern:*

Be it known that I, CHARLES H. VOSS, a citizen of the United States, residing at Hypoluxie, in the county of Palm Beach and State of Florida, have invented new and useful Improvements in Lighting Systems for Motor-Vehicles, of which the following is a specification.

This invention relates to head lights for automobiles and has for an object the provision of means whereby one of the lamps may be operated to deflect its rays to one side of the roadway or vehicle, while the light of the other lamp will be simultaneously dimmed, thus eliminating danger of the bright rays of light confusing approaching persons and at the same time direct the bright rays toward the side of the roadway away from said approaching persons or vehicle, so that danger of colliding is avoided.

Other objects and advantages of the invention will appear as the following description is read in connection with the accompanying drawings.

In the drawings:—

Figure 1:
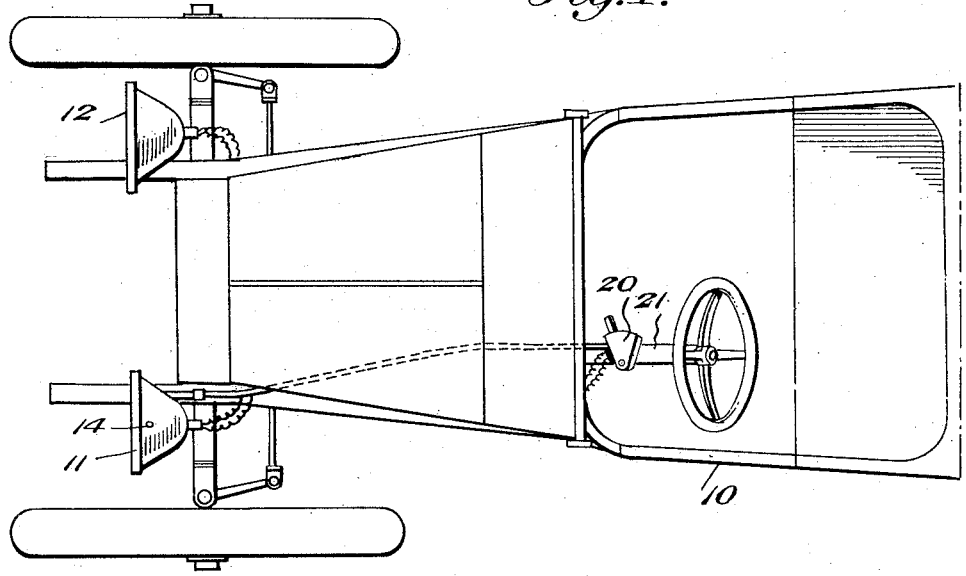
Figure 1 is a top plan view of a portion of an automobile with the invention applied thereto.

Referring to the drawings in detail, wherein like characters of reference denote corresponding parts, the reference character 10 indicates a portion of an automobile upon which is mounted head lamps 11 and 12. The lamps may be mounted in any preferred manner, the lamp 11 being provided with a pivotally mounted parabolic reflector 13, the pivotal connections of which are indicated at 14. The source of light herein shown as an incandescent lamp 15 is carried by the reflector 13.

Secured to the reflector 13 as indicated at 16, is one end of a flexible rod or wire 17. This wire or rod operates within a tube or casing 18 and its opposite end is connected to a hand lever 19 which is mounted in a casing 20 suitably secured to the steering column 21 of the automobile.

Figure 2:
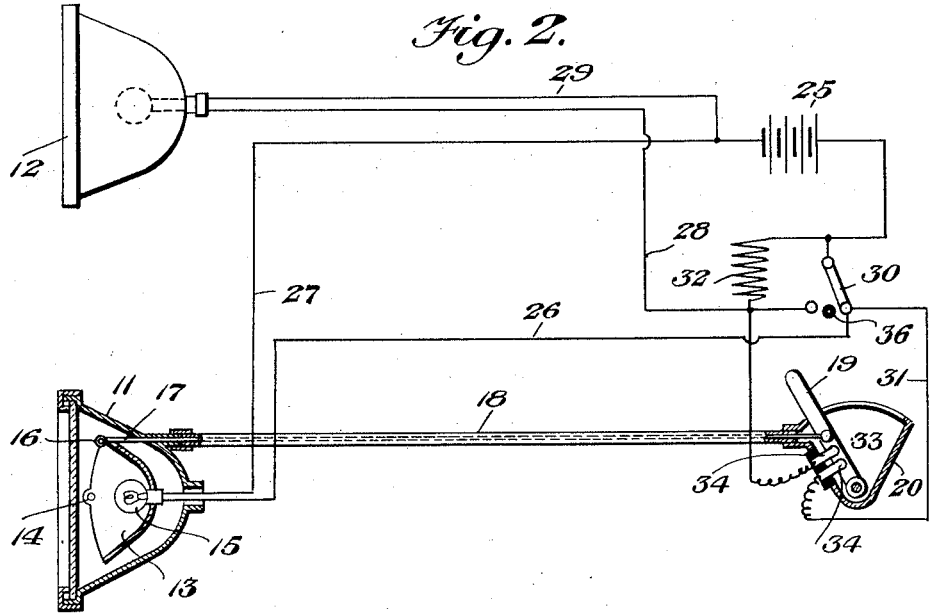
Fig. 2 is a diagrammatic view.

Normally the reflector 13 is positioned so as to direct the rays of light forward in a straight line, the reflector then occupying the position shown in Fig. 2 of the drawings, with the lever 19 extending forward. By pulling the lever 19 rearward, the reflector will be moved upon its pivots 14 and the rays of light directed to the opposite side of the vehicle or roadway. As the pivoted reflector is mounted within the left hand lamp of the vehicle, the rays will be directed over to the right hand side of the roadway and out of the way of approaching vehicles or persons, so that no confusion results and danger of colliding is reduced.

The lamps 11 and 12 are connected to a suitable source of current, such as a battery 25, a conductor 26 leading from one pole of the battery to the lamp 11, while a conductor 27 leads from the lamp to the opposite battery pole. A conductor 28 leads from the battery to the lamp 12, while a conductor 29 leads from the lamp 12 back to the battery. This conductor serves to supply the lamps 11 and 12 with the full strength of current from the battery, so that the lamps will be brightly illuminated. A switch 30 is connected to the conductor 26, while a shunt circuit 31 has one terminal tapped on to the switch and its opposite terminal connected to one pole of the battery through a resistance coil 32. A normally closed switch 33 is included in the shunt circuit, the said switch including the lever 19, so that the switch is opened by the operation of this lever when the reflector 13 of the lamp 11 is moved upon its pivot for directing the rays of light to the opposite side of the roadway. For this purpose the switch includes spaced contact members 34 which are bridged by the lever 19. Normally, current flows from one side of the battery through the shunt circuit 31 which is tapped to the resistance 32 and also to the conductor 28, the current passing from the shunt circuit 31 through the conductors 28 to the lamp 12 and back to the battery 25 through the conductor 29. Current to the lamp 11 is supplied through the conductor 26 to the said lamp, while the conductor 27 leads from the lamp back to the battery. When the switch 33 is opened, the current to the lamp 11 will travel in its usual course, while current to the lamp 12 will pass from the resistance 32 along the conductor 28 to the lamp 12 and back to the battery through the conductor 29. Thus, when the rays from the lamp 11 are deflected toward the lamp 12, the last mentioned lamp will be dimmed and as the lamp 11 occupies a position upon the left side of the vehicle, the rays of light will be directed away from the driver of an approaching vehicle. By moving the lever of the switch 30 to the opposite contact point, the resistance coil 32 will be cut out from both lamps, so that full power of the lamps will be had irrespective of the position of the lever 19. If desired, the switch 30 may be spaced upon a neutral or dead contact 36, whereupon the current to both lamps will pass from the resistance coil 32 to dim both lights.

The invention is susceptible of various changes in its form, proportions and minor details of construction and the right is herein reserved to make such changes as properly fall within the scope of the appended claims.

Having described the invention what is claimed is:—

1. The combination with a pair of electric head lamps for vehicles arranged to normally illuminate the roadway directly in front of the vehicle, of simultaneously operated means for directing the rays of light from one lamp to one side of the roadway and for dimming the light of the other lamp.

2. The combination with a vehicle having a pair of electric head lamps arranged to normally illuminate the roadway directly in front of the vehicle, of means for directing the rays of light from one lamp to one side of the roadway, means for dimming the light of the other lamp and means located within convenient reach of the vehicle driver for simultaneously operating the light directing and dimming means.

3. The combination with a pair of electric head lamps for vehicles, of a reflector mounted for pivotal movement in one of said lamps and carrying a source of light, an operating lever, means connecting the operating lever with the reflector, means whereby the light of the other lamp may be dimmed and means whereby the operation of the lever to control the movement of the pivoted reflector will also control the light dimming means.

In testimony whereof I affix my signature.

CHARLES H. VOSS.